United States Patent [19]

Dannatt

[11] 4,421,400

[45] Dec. 20, 1983

[54] FOLDED BEAM ADJUSTMENT

[75] Inventor: Hugh St. L. Dannatt, Bethel, Conn.

[73] Assignee: Pitney Bowes Inc., Stamford, Conn.

[21] Appl. No.: 378,038

[22] Filed: May 14, 1982

[51] Int. Cl.$^3$ ............................................. G03B 27/00
[52] U.S. Cl. ........................................ 355/1; 350/299
[58] Field of Search ...................... 350/299, 300; 355/1

[56] References Cited

U.S. PATENT DOCUMENTS 3,516,727 6/1970 Hickey et al. ...................... 350/299
3,531,183 9/1970 Aagard ................................ 350/299

Primary Examiner—Monroe H. Hayes
Attorney, Agent, or Firm—Lawrence E. Sklar; William D. Soltow, Jr.; Albert W. Scribner

[57] ABSTRACT

In an optical scanning system for scanning an original document to be copied, in which the system includes a carriage, an array of fiber optics for illuminating the original document with a line of light, a first mirror, a second mirror opposing the first mirror and forming an acute angle therewith, the mirrors being separated by a predetermined distance, whereby one end of the mirrors is more open than the other end of the mirrors and input light rays enter at the more open end of the mirrors upon the first mirror at a predetermined angle, and wherein the light rays are reflected off each of the mirrors a predetermined multiplicity of times and exit the mirrors at the more open end by reflecting off the second mirror at the same predetermined angle the input rays make with the first mirror, and a lens cell for focusing the line of light upon a light sensitive surface, an improved adjustment mechanism for the lens cell. The improved adjustment mechanism includes an inner barrel member surroundingly engaging the lens cell, an outer barrel member slidingly retaining the inner barrel member, the outer barrel member having a flared end, a two dimensionally contoured ring surface on the carriage on which the flared end of the outer barrel member is seated, a device for longitudinally sliding the inner barrel member within the outer barrel member, and another device for swivelling the outer barrel member vertically and laterally.

3 Claims, 3 Drawing Figures

FOLDED BEAM ADJUSTMENT

BACKGROUND OF THE INVENTION

The instant invention relates to an optical path folding system and more particularly to an adjustment device for such a system utilizing a pair of mirrors forming an acute angle therebetween for compact packaging of scanning devices or line imaging optical systems incorporating a charge coupled device (CCD) sensor.

Specifically, there is a class of optical scanners that incorporates the source material supported by a transparent platen in the proximity of a moving carriage caused to traverse in a path parallel to the platen and source material. By a combination of optical and electronic means the image of the source material may be dissected, converted into a train of electronic pulses, and reconstructed on a cathde ray tube or the like. If the reproduction means form part of a zerographic or photographic device, copies may be received, reconstructed and reproduced at some remote location.

Scanners of the above type can assume an unwieldy form if no attempt is made to compact the optical path and enable the scanner carriage (or electronic camera) to traverse in close proximity to the platen. This could be achieved, for example, with the aid of a super wide field, close up or fish eye lens. Alternatively, suitably mounted mirrors situated at each end of the carriage path may reflect the beam back and forth in such a manner as to maintain a constant lens-to-subject distance, independent of the position of the carriage. The first system involves an elaborate and expensive lens and still may be unwieldy, while the latter system involves an elongated optical path, limited by lens aperture and which is susceptible to the effects of vibration and which in general increases the size of the mechanism.

A solution which provides the requisite compactness and ridigity involves a process of folding the light beam within the moving carriage itself. This beam folding process may be achieved through the agency of mirrors or a prism and if suitably oriented, several successive reflections may significantly condense an appreciable portion of the beam length. The beam folding process, however, is not without problems in that errors of alignment become compounded and remedial adjustments are less easily understood and tend to cause simultaneous changes between various axes.

The most typical embodiment as applied to electrophotocopiers and the like requires, in addition to focal adjustment, the ability to shift the lens barrel and to tilt mirrors. Where the lens, mirrors and CCD form an integral sub-assembly, such a method imposes time consuming and exacting requirements.

Systems have been made where the lens barrel and CCD form an integral sub-assembly slidably mounted to move transversely on an appropriate deck surface, thereby permitting the lens/CCD sub-assembly to be manipulated so that the image of the document being copied may be projected upon the CCD sensitive area. However, this arrangement leaves something to be desired since the rays may be expected to pass obliquely through the lens system even for relatively minor error connection and may lead to vignetting and distortions due to curvilinear and other lens aberrations.

The system of adjustments embodied in the instant invention permits the ray path to remain substantially on the axis of the lens, permits a relaxation or elimination of separate mirror adjustments and yet attains the desired subject-to-CCD image reciprocity. Where the light path is folded by multiple mirror reflections, the angular relationship of individual ray paths, at the input pupil of the lens follows the same angular relationship as it would had the system comprised an unfolded ray arrangement, i.e. the rays coming directly from the illuminated subject with the same subject-to-pupil distance without the intervening mirrors.

More specifically, if the distance in respect of a non-mirrored system was, for example, 30 cm., then if the lens were constrained to follow a radial path of 30 cm. the rays would remain substantially upon the axis of the lens even if the lens were swung through a significant angle. This is analagous to a photographer moving his camera to one side but maintaining the same distance to the subject and then rotating the camera to again face the subject.

In order to extend and enhance this property associated with the radial path, if the origin of the generating radius be, for example, $\frac{2}{3}$ of the cited 30 cm., namely 20 cm., the angular accommodating property would be influenced only to a minor degree, however. In addition to the angular remedial adjustment an accommodation to lateral subject displacement may be incorporated.

The selection of an optimum radius for fore-and-aft in contrast to side-to-side movement must be addressed to different objectives. For example, a loss of definition across the copy (side-to-side movement) as opposed to a loss of illumination due to the subject area being outside the projected fiber optic light swath.

Accordingly, the instant invention isolates the various components of adjustment and enables the scanner system to be aligned accurately without a repetitious back-tracking process as is usually required.

SUMMARY OF THE INVENTION

The instant invention provides an improved adjustment mechanism for a lens cell in an optical scanning system for scanning an original document to be copied. The system includes (a) a carriage, (b) an array of light conducting, optical fibers for illuminating said original document with a line of light, (c) a first mirror, (d) a second mirror opposing said first mirror and forming an acute angle therewith, said mirrors being separated by a predetermined distance, whereby one end of said mirrors is more open than the other end of said mirrors and input light rays enter at the more open end of said mirrors upon said first mirror at a predetermined angle, and wherein said light rays are reflected off each of said mirrors a predetermined multiplicity of times and exit said mirrors at the more open end by reflecting off said second mirror at the same predetermined angle the input rays make with said first mirror, and (e) a lens cell for focusing said line of light upon a light sensitive surface. The improved adjustment mechanism comprises (i) an inner barrel member surroundingly engaging the lens cell; (ii) an outer barrel member slidingly retaining said inner barrel member, said outer barrel member having a flared end; (iii) a two dimensionally contoured ring surface on said carriage on which said flared end of said outer barrel member is seated; (iv) means for longitudinally sliding said inner barrel member within said outer barrel member; and (v) means for swivelling the outer barrel member vertically and laterally.

DETAILED DESCRIPTION

Figure 1:
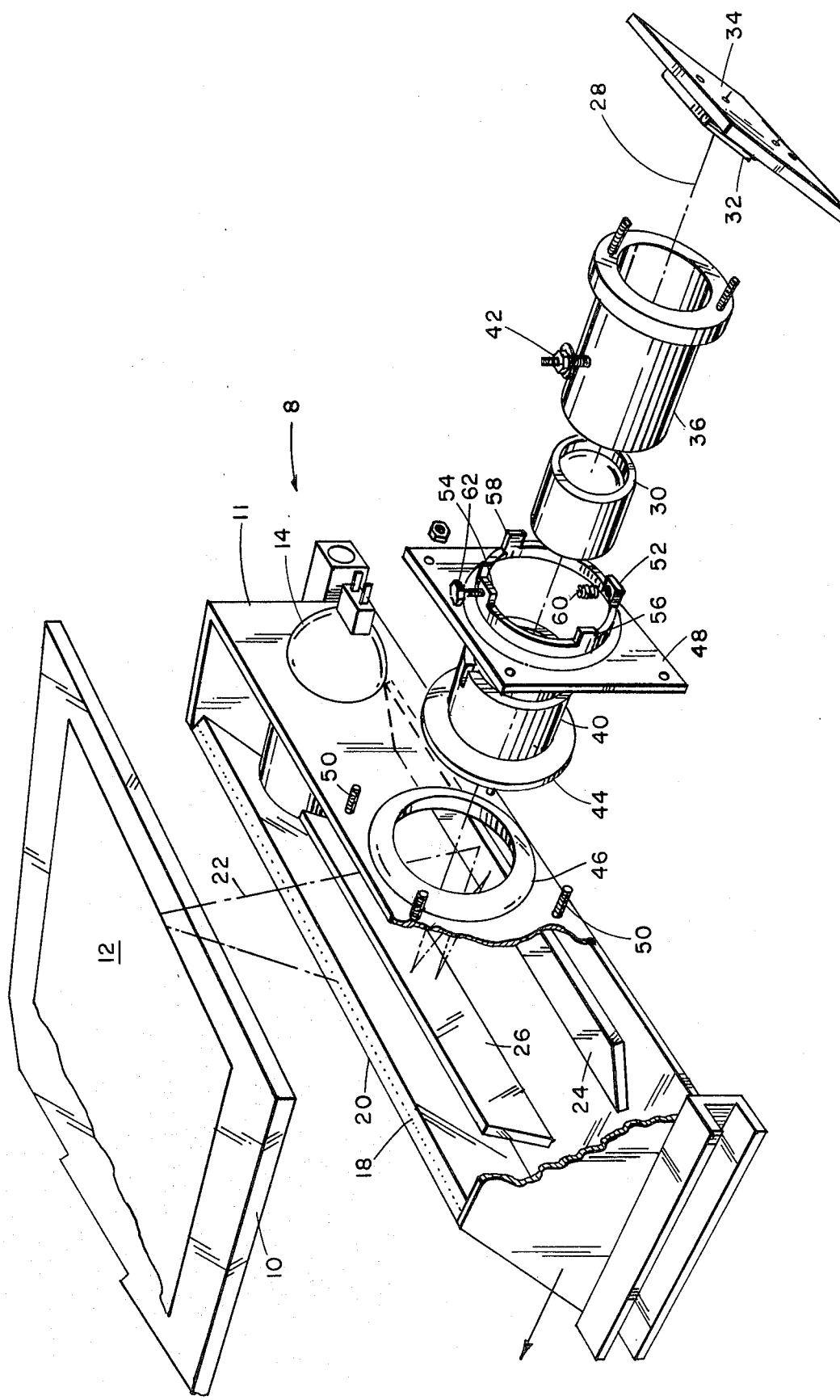
FIG. 1 is an exploded, perspective view of a scanning system incorporating the adjustment system of the instant invention.
Figure 2:
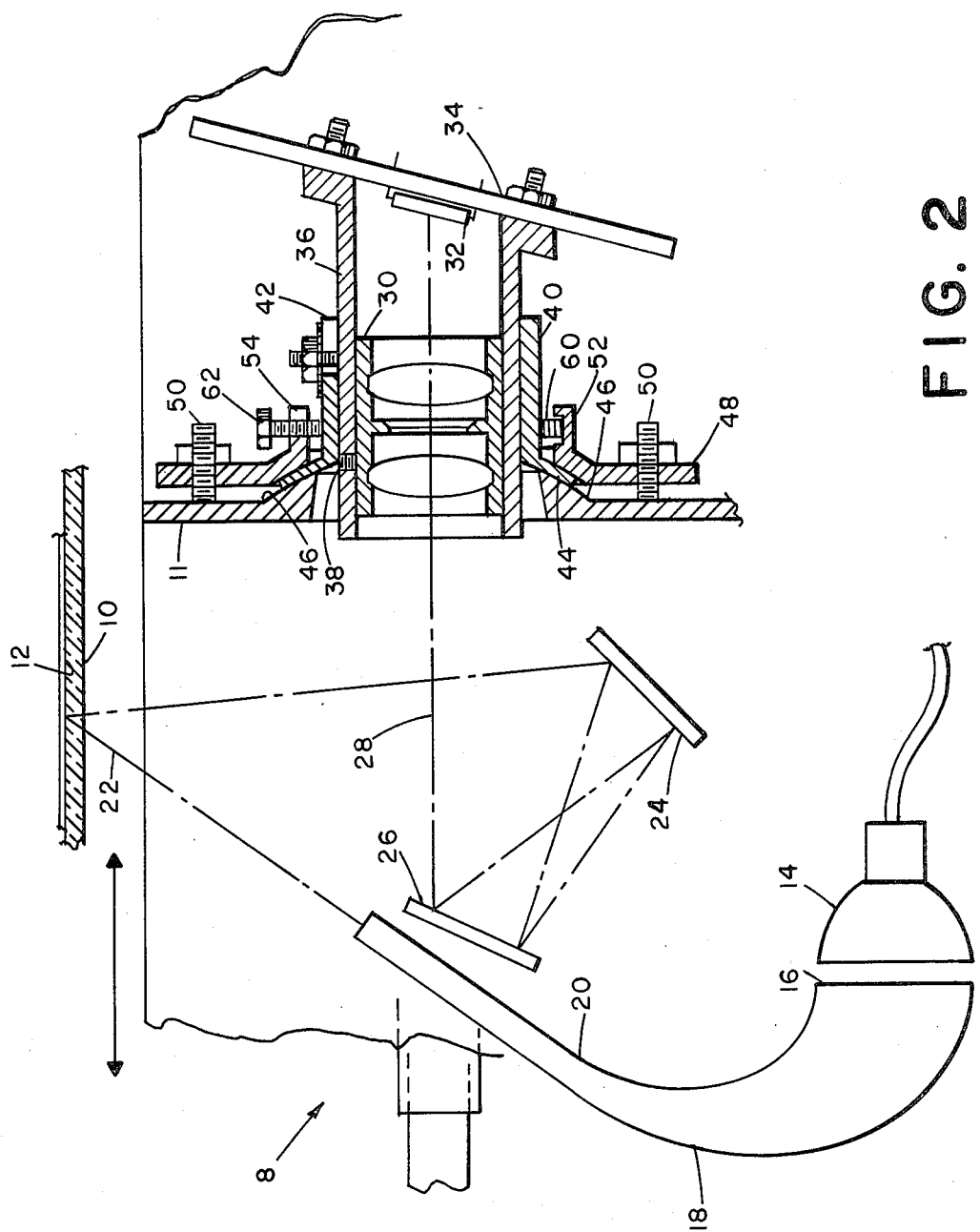
FIG. 2 is a side elevational view of the scanning system and adjustment system seen in FIG. 1.

In describing the preferred embodiment of the instant invention, reference is made to the drawings wherein there is seen in FIGS. 1 and 2 an optical scanning system generally designated 8 including a glass platen 10 situated above a carriage member 11 and supporting an original document 12 to be scanned and copied. The original document 12 is illuminated by means of a lamp 14 mounted in the carriage 11 which provides a bundle of light rays 22 directed toward the input end 16 of an array of optical fibers 18 also mounted on the carriage 11 such as those produced by Welch Allyn, Inc., Skaneateles, N.Y. under the name FFO by the Dupont Company under the name Crofon. The input end 16 (see FIG. 2) of the fibers 18 comprises essentially a circular form which becomes at the output end 20 of the fibers 18 a line consisting typically of one or two rows of fibers 18 which direct a line of light 22 toward the original document 12 being scanned and copied. The line of light 22 is reflected off the surface of the document 12 and through the glass platen 10 onto a first mirror 24 secured to the carriage 11 and thence to a second mirror 26 also secured to the carriage 11 oriented at a predetermined acute angle with respect to the first mirror 24 so that the line of light 22 is reflected off each mirror at least twice in order that the line of light 22 can exit the space between the two mirrors 24 and 26 as a line of light 28 on the same side as it entered, being the more open end, in accordance with the teachings of copending patent application Ser. No. 311,696 filed Oct. 15, 1981 by the assignee of the instant invention in the name of David Kleinschmitt. The exit line of light 28 then strikes lens cell 30 from which it is focused onto a charge coupled device (CCD) moduel 32 which is soldered into a printing circuit board 34, all of which are mounted on the moving carriage 11 as further described hereinbelow.

The printing circuit board 34 is attached to an inner barrel member 36, and the lens cell 30 is preadjusted in relationship to the CCD 32 to suit the scale and focal relationship. The lens cell 30 is locked in place by a set screw 38. An outer barrel 40 retains the inner barrel 36 which may be longitudinally adjusted and finally clamped by means of a stud, nut and saddle washer assembly 42.

The outer barrel 40 includes a flared end 44 which seats on a spherical ring surface 46 which forms part of the carriage 11. A clamp plate 48 secures the entire lens assembly described hereinabove essentially by means of studs 50. The clamp plate 48 carries four tab projections 52, 54, 56, and 58. The lower tab 52 retains a spring 60 and the upper tab 54 carries a screw 62. the side tabs 56 and 58 have neither screws nor springs.

From the foregoing it can be seen that with appropriate manipulation, the inner barrel 36 may be rotated and longitudinally slid within the outer barrel 40. Also, the outer barrel 40 may be swivelled vertically by means of the top screw 62 reacting against the spring 60. Further, the outer barrel 40 can be swivelled laterally by prying between the outer barrel 40 and the side tabs 56 and 58 with the aid of a small screw driver or wedge shaped tool.

Figure 3:
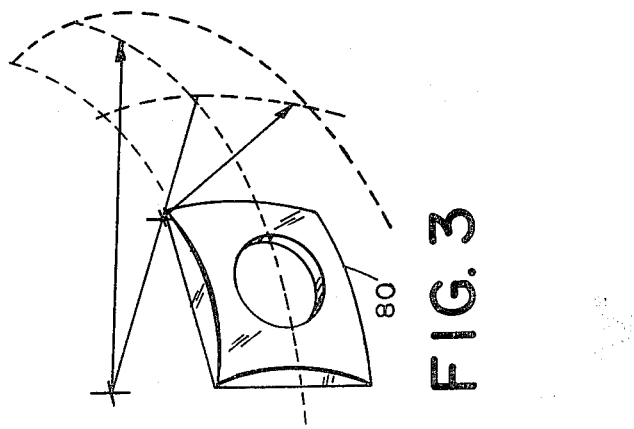
FIG. 3 is an enlarged, perspective view of an alternative embodiment of the seating ring for the lens barrel.

In FIG. 3 is seen an alternative embodiment of the ring surface 46. In the alternative embodiment, a toroidal ring surface 80 is used in place of the spherical ring surface 46 in order to gain variable adjustability in the vertical and lateral directions.

As indicated hereinabove, the system of adjustment permits the mirrors 24 and 26 and the optical fibers 18 to be secured in place without the need for further realignment. For the purpose of adjustment, which is executed during final assembly of the scanning system, a ground glass strip is substituted for the glass platen 10. Typically, the ground glass carries an 8.5 inch line with cross lines at the 8.5 inch span and one midway between.

With the lamp 14 active, the ground glass is aligned so that the three target marks (cross lines) are aligned with the illuminated area. The CCD module 32 is removed and replaced by a mask, pierced by three pin holes representing the center and the two outer extremes of the CCD module active area. The mask provisions for back illumination and thus light beams may be projected through the system to fall upon the ground glass strip.

The adjustment procedure is directed to projecting the illuminated CCD mask apertures upon the fiducial marks on the ground glass strip. Prior to this final adjustment of the lens/CCD assembly in the scanner it is necessary for the lens to be correctly focused and oriented to the CCD in order to exactly establish a desired reduction, such as 8:1. This may be done with the aid of a foucault test or with the use of a collimator. In any event, the lens cell 30 is locked into the inner barrel 36 and should not be further disturbed.

It will be understood by those skilled in the art that various changes in form and details may be made therein without departing from the spirit and scope of the present invention.

What is claimed is:

1. In an optical scanning system for scanning an original document to be copied, said system including (a) a carrige, (b) an array of fiber optics for illuminating said original document with a line of light, (c) a first mirror, (d) a second mirror opposing said first mirror and forming an acute angle therewith, said mirrors being separated by a predetermined distance, whereby one end of said mirrors is more open than the other end of said mirrors and input light rays enter at the more open end of said mirrors upon said first mirror at a predetermined angle, and wherein said light rays are reflected off each of said mirrors a predetermined multiplicity of times and exit said mirrors at the more open end by reflecting off said second mirror at the same predetermined angle the input rays make with said first mirror, and (e) a lens cell for focusing said line of light upon a light sensitive surface, an improved adjustment mechanism for said lens cell, said improved adjustment mechanism comprising:

i. an inner barrel member surroundingly engaging said lens cell;
  ii. an outer barrel member slidingly retaining said inner barrel member, said outer barrel member having a flared end;
  iii. a two dimensionally contoured ring surface on said carriage on which said flared end of said barrel member is seated;

iv. means for longitudinally sliding said inner barrel member within said outer barrel member; and v. means for swivelling the outer barrel member vertically and laterally.

2. The improved adjustment mechanism of claim 1, wherein the two dimensionally contoured ring surface comprises a spherical ring surface.

3. The improved adjustment mechanism of claim 1, wherein the two dimensionally contoured ring surface comprises a toroidal ring surface.

* * * * *